United States Patent [19]

Languillat

[11] Patent Number: 4,713,992

[45] Date of Patent: Dec. 22, 1987

[54] PROCESS AND APPARATUS FOR TRUNCATING TUBES

[75] Inventor: Jean-Paul Languillat, Vallieres Par Thorigny sur Oreuse, France

[73] Assignee: Lhomme S.A., Pont sur Yonne, France

[21] Appl. No.: 859,402

[22] Filed: May 5, 1986

[30] Foreign Application Priority Data

May 6, 1985 [FR] France ................................. 85 06868

[51] Int. Cl.[4] .............................................. B23B 5/14
[52] U.S. Cl. ............................................ 82/48; 82/83; 82/87; 82/89; 82/90; 82/100; 82/101; 82/102
[58] Field of Search ................... 82/46, 47, 48, 70, 83, 82/87, 89, 90, 100, 101, 102; 83/467 R, 467 A, 468, 180

[56] References Cited

U.S. PATENT DOCUMENTS

| 878,705 | 2/1908 | Adams | 82/89 |
|---|---|---|---|
| 1,685,127 | 9/1928 | Hammond | 82/89 |
| 1,698,250 | 1/1929 | Adams | 82/89 |
| 2,181,124 | 11/1939 | Edwards et al. | 82/102 |
| 2,186,583 | 1/1940 | Groh | 82/89 |
| 2,521,003 | 9/1950 | Gitter | 82/101 |
| 2,521,004 | 9/1950 | Gitter | 82/48 |
| 3,161,097 | 12/1964 | Judelson | |
| 3,185,005 | 5/1965 | Judelson | |
| 3,911,768 | 10/1975 | Kawano | 82/101 |

FOREIGN PATENT DOCUMENTS 1390022  4/1985  United Kingdom .

Primary Examiner—Nicholas P. Godici
Assistant Examiner—Jerry Kearns
Attorney, Agent, or Firm—& Greenblum Sandler

[57] ABSTRACT

The invention relates to a truncation apparatus and a process of truncating tubes. The truncation apparatus includes a mandrel, a means for advancing the tube to be truncated along the mandrel, at least one knife positioned in proximity to the free end of the mandrel, a slide moveably mounted on the mandrel and an exterior abutment whose distance with respect to the knife is adjustable, in addition to at least one reference system which is longitudinally adjustable adjacent the mandrel and defines predetermined and adjustable lengths between the front end of slide and the knife, and is provided with means to stop the longitudinal displacement of the slide in a manner so as to define a selected length for the last truncated portion of the tube. A method for truncating tubes wherein a length of tube is positioned on a mandrel and cut into at least a first section including one of the end edges of the tube and a last section including the other end edge of the tube.

7 Claims, 2 Drawing Figures

PROCESS AND APPARATUS FOR TRUNCATING TUBES

BACKGROUND OF THE INVENTION

1. Field of the Invention

The invention relates to a process and apparatus for truncating tubes and particularly tubes made out of cardboard or of plastic material.

2. Description of Background and Relevant Material

A known tube truncation apparatus includes a mandrel which is mounted in a cantilever fashion on a frame. In such a case, at least the exterior surface of the mandrel is fixed in position, while at least one knife is provided adjacent to the free end of the mandrel.

To truncate a tube, the tube is placed on the mandrel. Typically the exterior diameter of the mandrel is approximately the same or slightly smaller than the interior diameter of the tube so that the tube can be easily slid thereover. The tube is then rotated while the knife, carried for example by a carriage, is activated perpendicularly to the tube to penetrate the wall of the tube and cut completely through the tube until the knife meets a counterpart or hard counterknife provided on the mandrel.

Although the mandrel is fixed, the mandrel includes, for example, a retractable, expandable portion, which may be motorized for rotation. In order to rotate the tube which has been placed on the mandrel, the expandable portion of the mandrel is first activated to expand into contact with the interior of the tube and grip it securely before the motor is energized to rotate the expandable portion and the tube around the stationary part of the mandrel. The expandable portion of the mandrel may be provided adjacent to the free end of the mandrel in the proximity of the hard counterportion, but typically is located more towards the opposite end of the mandrel.

To make it possible to cut truncated portions of desired length and to then remove the truncated sections, the truncating apparatus includes a slide in the form of a ring which is slideably mounted on the mandrel so that the slide can move along the length of the mandrel, in addition to an exterior retractable abutment which is also longitudinally adjustable. The adjustment of the abutment in a longitudinal direction makes it possible to determine the length between the knife and the abutment. After the adjustment of the abutment, the slide presses the tube against the abutment, for example, by means of a spring, so that a desired length of tube can be cut and then ejected by activating the ejector after the exterior abutment has been withdrawn and the expandable portion of the mandrel has been retracted.

In this type of truncation apparatus, however, the expandable portion continuously rotates and it is clear that after expansion of this portion the end edges of the tube rubs respectively on the exterior abutment and on the slide in such a way that the end edges may become partially damaged. Moreover, inasmuch as the expandable portion of the mandrel is positioned ahead of the knife with respect to the free end of the mandrel, it is necessary to have a length of the tube on the mandrel which at a minimum corresponds to the distance between the knife and the interior end of the expandable portion in order to cut the last section of tube. Typically, the total length of the tube to be cut which is placed on the mandrel is greater than the sum of the lengths of tube sections which are actually cut from the tube. The excess length is necessary to make up for an amount of waste which unavoidably results from the cutting procedure, for example which is lost as sawdust. Inasmuch as it is difficult to estimate precisely the exact amount of this type of waste, the length of the tube must also include extra length to insure that a sufficient length of tube remains on the mandrel for cutting the last section of tube to a desired length. Thus, after the final cut has been made to form the last section of tube, a short length of tube remains which falls off the mandrel as a piece of scrap so that a fresh tube can be placed on the mandrel to begin a new cutting procedure. As a practical matter, the extreme end edges of the tube placed on the mandrel to be cut are usually of better quality than the end edges of sections cut therefrom during the cutting operation. Unfortunately, one end edge of the piece of scrap is one of the original end edges of the tube. Consequently, conventional tube cutting procedures are extremely inefficient in being unable to cut a tube in such a way that both of the extreme end edges of the original are recovered in a desired length of tube. Even in the best cases where the amount of the tube on the mandrel which is wasted is reduced to a minimum, the length of tube to be cut which projects from the mandrel is nevertheless not held very securely by the rest of the tube to the mandrel so that the tubes are presented to the knife at an angle and are not cut squarely. Finally, the maximum length of a truncated portion is limited to the maximum distance between the exterior abutment and the knife.

As previously mentioned, it is advantageous to recover the original end edges of tubes to be cut into sections which are formed from a continuously formed tube because the end edges of such continuously formed tubes are of particularly good quality and/or are intended for subsequent treatment, such as notching, polishing, coloration, and snap-rivetting. This is similarly true for tubes to be truncated which have been subjected to a surface treatment adapted to harden the exterior surface which causes the cutting of the tube to become a more delicate operation than if a raw tube was being cut. In either case, the present invention is particularly suitable in resulting with two sections of tube, i.e. the first section and the last section of tube, which have been cut so as to retain one of the two original end edges of the tube placed on the mandrel. The process and apparatus of the present invention is advantageous in overcoming the shortcomings of prior art techniques as to the quality of the end edges of the tube section, particularly an end edge of the section cut from the last portion of the tube on the mandrel. In addition, the amounts of waste and scrap are reduced and it is possible to cut lengths of tube which approximate the length of tube placed on the mandrel.

SUMMARY OF THE INVENTION

The present invention is directed to an apparatus for truncating a tube positioned on a mandrel and having a free end that moves forwardly in an axial direction and an opposite end, including a mandrel having one end attached to a frame on which a tube to be cut is mounted; and an opposite free end; a slide coaxially mounted on the mandrel so as to contact the opposite end of the tube and adapted to move axially from one end towards the free end of the mandrel; means to move the slide operably connected to the slide so as to advance the tube; means for cutting located adjacent to the free end of the mandrel; an abutment adjustably positioned so as to engage the free end of the tube; a reference system adapted to communicate with the slide for determining the distance between the slide and the means for cutting and for controlling the means to move the slide. The means for coupling the slide with the means to move the slide includes a projection; and the reference system includes a carriage located adjacent to the mandrel and adapted to move axially parallel with respect to the mandrel, having an element adapted to contact the projection when the means for coupling and the carriage are aligned in the same plane transverse to the longitudinal axis of the mandrel. The means for coupling may also include another projection in which case the carriage includes another element adapted to contact the another projection, wherein contact between the projection and the element causes the advance of the slide, and contact between the another projection and the another element prevents the advance of the slide. A stopper is preferably mounted on the carriage in which case the slide is provided with an annular ring or collar adapted to contact the stopper after the another projection of the means for coupling contacts the another element of the carriage. The reference system preferably includes a scale having indicia representing distances between said forward end of the slide and the means for cutting and the carriage includes an indicator mounted so as to point to an indicia on the scale to show an exact distance corresponding to a length of tube to be cut. Preferably the apparatus in accordance with the present invention includes more than one reference system. It is also preferred to provide the mandrel with an expandable collar in the vicinity of the free end of the mandrel contacting the interior of the tube, with collar being adapted to rotate when said tube is brought into position to be cut by the means for cutting.

The present invention is also directed to a method for truncating tubes which involves providing a tube having a forward end edge and a trailing end edge to be cut into a first section, and a last section; cutting the first section from the tube so that one of the end edges of the first section is the forward end edge of the tube; and cutting the last section from the tube so that one of the end edges of the last section is the trailing end edge of the tube. The method also involved cutting at least one intermediate section from the tube between the first section and the last section. Preferably, the method also involves cutting a piece of scrap from the tube intermediate the first section and the last section, preferably simultaneously with cutting the last section.

BRIEF DESCRIPTION OF DRAWINGS

The invention would be better understood and other details will appear from reading the description which follows and which refers to the annexed drawings in which.

DESCRIPTION OF PREFERRED EMBODIMENTS

Figure 1:
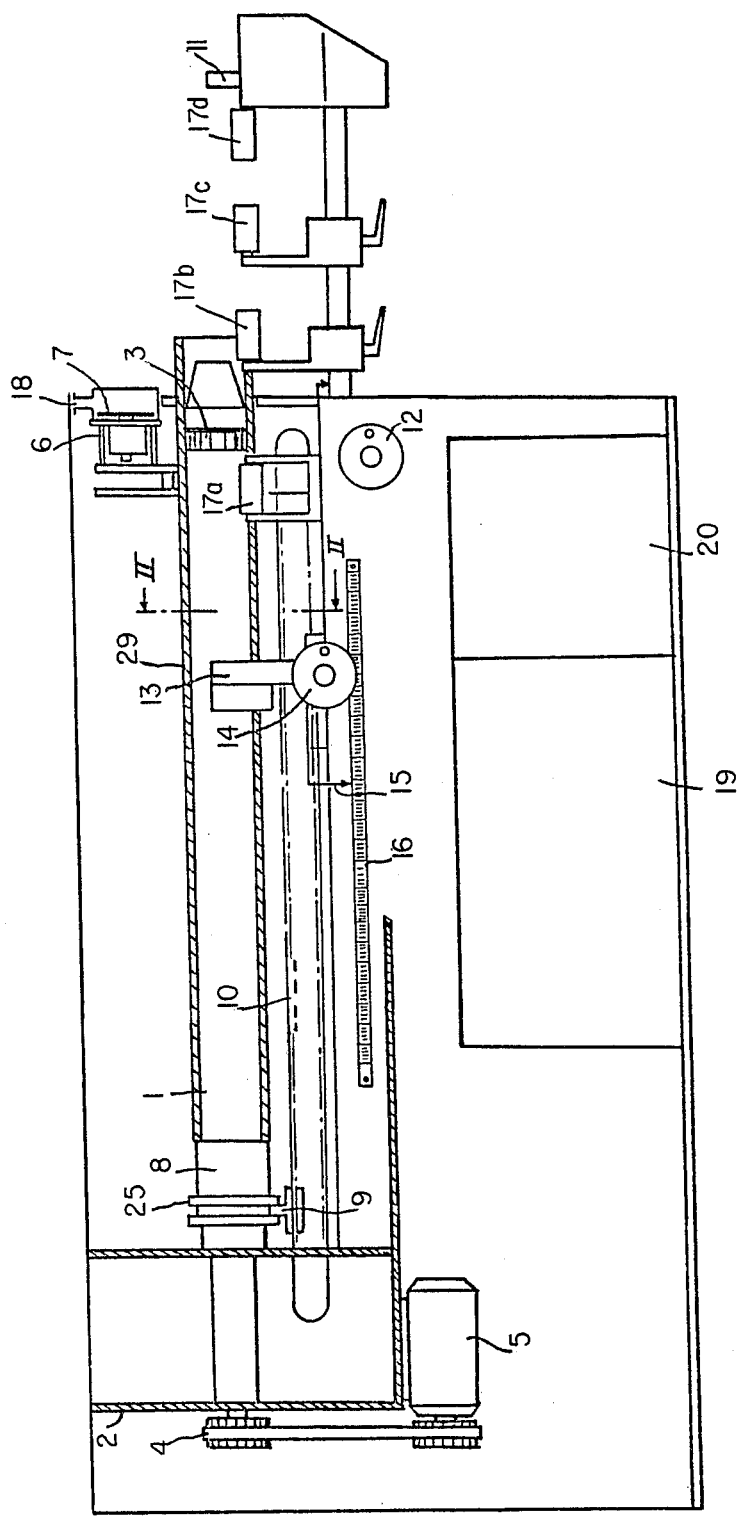
FIG. 1 is a side view illustrating a truncation apparatus according to the invention wherein the tube 29 is shown in cross section.

The truncation apparatus in accordance with the present invention is novel and unique in that it embodies at least one interior reference system which is longitudinally adjustable for determining and adjusting the distance between the front end of the slide and the knife. This reference system is provided with means to stop the longitudinal displacement of the slide in a manner so as to define at least one truncation of selected length as well as a last truncation of which one of the end edges is the same as one of the end edges of the tube originally placed on the mandrel to be cut. Preferably, the reference system includes an apparatus which is movably mounted so as to be longitudinally adjustable in front of a means for measurement and which is provided with at least a micro-contact or a projection adapted to cooperate with a projection or a micro-contact, respectively, integral with the slide so as to control the activation of the means for driving the slide.

According to one embodiment, the moveable apparatus of the reference system includes two micro-contacts, or alternatively projections, positioned sequentially in the direction of advancement of the slide. In this case, the projection located closest to the slide is adapted to control the advancement of the slide and the other projection, the stoppage of the means for driving the slide. Preferably, the moveable apparatus of the reference system also includes an abutment, which may be retractable and is adapted in a manner so that a portion of the abutment which projects relative to the slide comes into contact with the slide slightly after the cooperation of the previously mentioned micro-contacts and projections of the drive means of the slide, with timing means being provided to slightly delay the stop signal. Another embodiment includes a plurality of interior reference systems.

The present invention is also directed to a truncation method which is novel and unique in that it involves (a) cutting one or more truncations to the desired lengths as determined by an exterior abutment; and (b) cutting at least the last truncation to the desired length by means of an interior reference system.

According to an alternative embodiment, the operations of step (b) involve cutting one length of tube using the interior referencing system, adjusting the system to determine a total length representing the sum of the lengths of truncated tubes remaining to be cut, and thereafter displacing the referencing system towards the end of the mandrel by a length equal to the length desired for each truncated tube and continuing in that way so that the last truncated tube is formed by the length of tube section which remains after truncation of the next to last truncated tube.

The present invention is further directed to a novel process utilizing a truncation apparatus provided with a plurality of referencing systems which is unique in that it involves (a) cutting one or more truncations, as desired, by reference to the lengths of the tube by means of an exterior abutment; (b) adjusting a first interior referencing system to determine a total length representing the sum of the lengths of the truncated tubes remaining to be cut; (c) adjusting a second interior referencing system to a distance from the first interior referencing system which is equal to the desired length of a truncated tube and continuing in this way until the last system is adjusted to the desired length of the last truncated tube; (d) cutting a residual length of tube by reference to the first system; and (e) truncating the various truncated tubes by advancing the slide whose stops are controlled by each of the referencing systems which follow.

Preferably in all cases, the tube to be truncated is locked in position on an attachment and rotation portion of the mandrel only after the pressure of the slide against the tube has been released and the exterior abutment has been retracted from contact with the tube so that the tube can be rotated without rubbing against the slide and the abutment.

The truncation apparatus according to the invention includes a conventional mandrel 1 which may be provided with a flange mounted on a frame 2. Mandrel 1 (not shown in greater detail) includes an exterior sheath which is fixed, and an expandable and retractable portion 3 adjacent to its free end. The portion 3 can be expanded or retracted by means provided on the interior of the mandrel (not shown) and rotated by means of a transmission 4 moved by a motor 5. A means for cutting 6 preferably including a circular knife 7 which may be fixed, motorized or otherwise adapted for rotation, or free in rotation, is also positioned in the vicinity of the free end of the mandrel so as to be closer to the free end of the mandrel than expandable portion 3. Knife 7 may, for example, be mounted on a carriage adapted to move transversely with respect to the tube, but is preferably mounted on a pivotable support moved by a jack towards the tube to be cut. A tubular slide or pusher 8, is mounted so as to be longitudinally slideable on mandrel 1 and is adapted for translational movement along the mandrel by a drive system provided with a means for coupling 9 and a notched band or continuous belt 10. A retractable abutment 11 is positioned downstream away from mandrel 1. The abutment 11 is adjustably spaced apart from knife 7 by means of an adjustment wheel 12. The truncation apparatus shown in FIG. 1 also includes guiding rollers 17a–17d' in addition to a vacuum source 18, an hydraulic system 19 and means for controlling the truncation operation 20.

The truncation apparatus in accordance with the present invention also includes a referencing system or interior reference 13 mounted on a moveable device which is adapted to slide parallel to mandrel 1. The reference system 13 is provided with a means for displacement such as a wheel 14, and includes an indicator 15 which is adjustably positioned along the face of a scale 16. The scale 16 is provided with graduated markings to represent the distance between the front end of slide 8 and knife 7.

Figure 2:
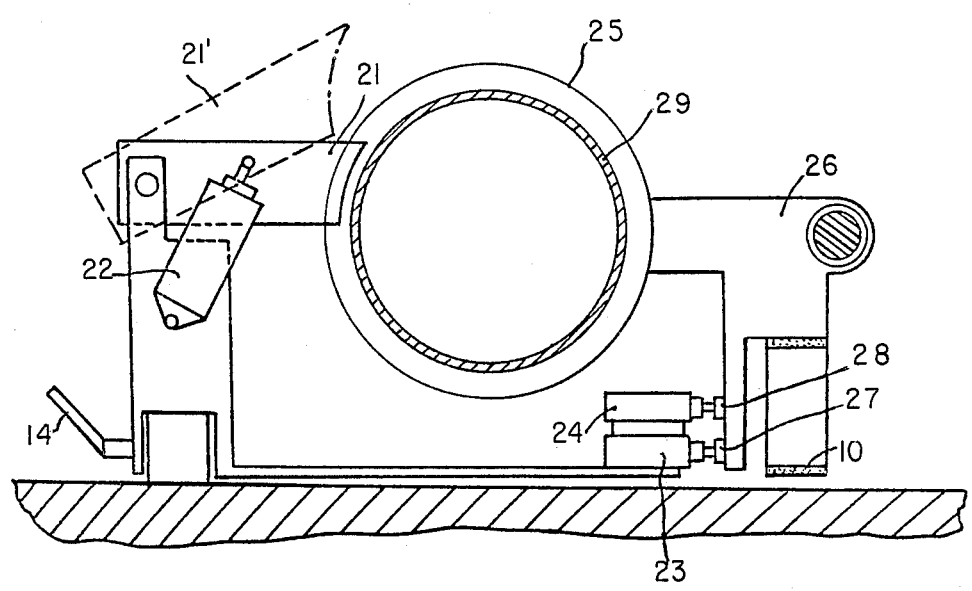
FIG. 2 is a simplified transverse cross sectional view on a larger scale of tube 29 taken along 2—2 of FIG. 1.

The reference system 13 appears in more detail in FIG. 2. The reference system 13 includes an abutment 21 which is pivotable and may be activated by a jack 22. As shown in FIG. 2, the abutment 21 is pivotably mounted on support 21a adapted to move longitudinally along one side of mandrel 1 on a means for guiding or rail 21b by activating means for displacement 14, either manually or by means of a motor with which it can be connected. Alternatively, the abutment 21 can be operably linked to the abutment 11 in such a manner that its movement and positioning along the mandrel is coordinated by adjusting abutment 11. Two consecutive micro-contacts 23 and 24 are mounted so as to be integral in translation with abutment 21. As shown, these micro contacts are mounted on the end of platform 21c which is integral with or attached at the bottom of support 21a and extends laterally from the support under mandrel 1 on which tube 29 is placed to the other side of mandrel.

Referring back to FIG. 1, slide or pusher 8 is provided with at least one, but preferably two, annular projections, collars or rings 25 in its rear portion (FIGS. 1 and 2). As previously mentioned, the projections are operably connected by means for coupling 9 to continuous belt 10 which, preferably together with intermediary coupler 26, translates slide 8 longitudinally towards the free end of mandrel 1. The coupler 26 is provided with two projections 27, 28 adapted to cooperate, respectively, with the micro-contact 23 and 24. When the micro-contact 23 is activated by contact with projection 27, micro-contact 23 causes the drive means to slowly advance slide 8 towards the free end of mandrel 1 while the micro-contact 24 stops the advance upon contact by projection 28. The arrangements of the abutment 21 and of micro-contacts 23 and 24 are such that annular ring 25 of slide 8 comes into contact with abutment 21 only slightly after activation of micro-contact 24 by projection 28. The stoppage signal for the drive means of slide 8 is slightly delayed in time so as to allow the slide to arrive at abutment 21.

As previously mentioned, the graduations of the scale 16 are made to indicate the exact distance between the front end of slide 8 and knife 7. The measurement of this distance is calculated when the annular ring 25 is in contact with abutment 21.

The tube to be truncated, shown in cross section in FIGS. 1 and 2 and generally designated as element 29, is first positioned on mandrel 1. In accordance with the process and apparatus of the present invention, a desired number of one or more truncations or tube sections may be cut in reference to exterior abutment 11, which preferably has a large surface area. In so doing, the tube 29 is advanced and adjusted in position towards abutment 11 by means of slide 8, with the exterior surface of the tube being guided and sustained by rollers 17b–17d along the way. The expandable portion 3 locks the tube into position after the tube has been placed on the mandrel, but the rotation of the tube does not occur until after abutment 11 has been retracted and slide 8 is disengaged from belt 10 so as to take the pressure off tube 29. Accordingly, although tube 29 is rotated as it is cut by knife 7, the ends of the tube are not damaged because abutment 11 and slide 8 are not in contact with the ends of the tube. Thus, the first section cut from the tube has a length equal to the distance abutment 11 is spaced from knife 7 and includes one of the original end edges of the tube and an end edge formed by the cutting action of the knife.

After the tube is cut into a first section, the remainder of the tube may be cut into one or more sections of tube by means of the reference system 13. In order to do so, system 13 is adjusted to determine a desired length for the last section of tube to be cut by advancing the tube until the collar of slide 8 comes into contact with abutment 21 which is positioned a distance away from knife 7 which corresponds to a desired length of the last section of tube to be cut. In a cooperative manner the micro-contact 23 assure an approach at slow speed and the micro-contact 24 stops this advance with a slight time delay. Here again, tube 29 is only rotated after the tube is gripped by element 3 and importantly only after the slide 8 has been disengaged in such a manner that the cut end of the piece of tube mounted on the mandrel can freely turn. When the knife 7 is activated, the final cut of the tube is made so that the last section of tube is the length of tube on the mandrel between slide 8 and knife 7. The length of tube which extends beyond knife 7 towards abutment 11 is cut to fall off as scrap, and each truncated section of tube can be easily ejected after retraction of abutment 21 by the pivotal movement of jack 22 from position 21' as shown on FIG. 2 in addition to the retraction of portion 3 of mandrel 1.

In accordance with the present invention, therefore, the first tube piece is cut to a length equal to the distance abutment 11 is spaced from knife 7 with the last piece of tube being cut to a size or length as determined by the reference system 13 which may be the same as the length of the first tube piece. In so doing, the fall-off waste or scrap occurs in a median zone of the tube sometime after the first cut but before the last cut is made and preferably as the last cut is being made, through the use of system 13. Accordingly, waste is reduced to a minimum because the cutting operation is more closely controlled so that there is very little difference between the length of tube 29 at the beginning of the cutting operation and the total length of the tube sections cut therefrom to be wasted as scrap and there is very little waste generated as sawdust as often occurs in the prior art due to placement of the knife. Thus, one actually only uses system 13 to cut the last section of tube. As was previously discussed, however, if one desired to make a plurality of tube cuts by means of the reference system 13, the system 13 can be adjusted in position along the tube after the cut of a first fall-off to result with a length of tube remaining which is equal to the sum of the lengths of all of the tubes which will be cut. In addition, the truncation apparatus described above can also include a plurality of reference systems 13. In such an apparatus the same principle is applied to the cutting operation, but instead of displacing system 13 along the tube as mentioned above, the various sytems 13 are positioned at predetermined locations along the tube to determine desired lengths of cut with the first system 13 representing the total length of the truncation.

The invention presents numerous advantages, as previously explained, such as making it possible to cut large lengths of tubes into sections without experiencing problems with unsquare ends and waste, and results with tube sections of good quality from the last as well as the first cut.

Although the invention has been described with reference to particular means, materials, and embodiments, it is to be understood that the invention is not limited to the particulars disclosed, for example the truncation apparatus may comprise a plurality of abutments and the invention extends to all embodiments falling within the scope of the claims. From the foregoing description, one skilled in the art can easily ascertain the essential characteristics of this invention and, without departing from the spirit and scope thereof, can make various changes and modifications of the invention to adapt it to various usage and conditions.

I claim:

1. An apparatus for truncating a tube positioned on a mandrel and having a free end that moves forwardly in an axial direction and a travelling end comprising:
   (a) a mandrel having one end attached to a frame and an opposite free end on which a tube to be cut is mounted;
   (b) a slide having a forward end coaxially mounted on said mandrel so as to contact said trailing end of the tube;
   (c) means to move said slide operably connected to said slide so as to advance the tube axially from said one end towards said free end of of said mandrel;
   (d) means for cutting located adjacent said free end of the mandrel;
   (e) an abutment for engaging the free end of the tube;
   (f) a reference system for determining the distance between said slide and said means for cutting and for controlling said means to move the slide, said reference system being positioned laterally with respect to said mandrel in communication with said slide.

2. An apparatus for truncating a tube positioned on a mandrel and having a free end that moves forwardly in an axial direction and a trailing end comprising;
   (a) a mandrel having one end attached to a frame and an opposite free end on which a tube to be cut is mounted;
   (b) a slide having a forward end coaxially mounted on said mandrel so as to contact said trailing end of the tube;
   (c) means to move said slide operably connected to said slide so as to advance the tube axially from said one end and towards said free end of said mandrel;
   (d) means for cutting located adjacent said free end of the mandrel;
   (e) an abutment for engaging the free end of the tube;
   (f) a reference system for determining the distance between said slide and said means for cutting and for controlling said means to move the slide, said reference system being positioned laterally with respect to said mandrel in communication with said slide; and
   (g) means for coupling said slide with said means to move said slide, said means for coupling including a projection, a carriage for moving axially parallel with respect to said mandrel, said carriage being provided with an element for contacting said projection when said means for coupling and said carriage are aligned in the same plane transverse to the longitudinal axis of said mandrel.

3. The apparatus in accordance with claim 2, wherein said means for coupling includes another projection and said carriage includes another element for contacting said another projection, wherein contact between said projection and said element causes the advance of said slide, and contact between said another projection and said another element prevents the advance of said slide.

4. The apparatus in accordance with claim 3, comprising a stopper mounted on said carriage and said slide is provided with an annular ring for contacting said stopper after said another projection of the means for coupling contacts said another element of said carriage.

5. The apparatus in accordance with claim 4, comprising more than one reference system.

6. The apparatus in accordance with claim 4, wherein said reference system includes a scale having indicia representing distances between said forward end of said slide and said means for cutting and said carriage includes an indicator mounted so as to point to an indicia on said scale to show an exact distance corresponding to a length of tube to be cut.

7. An apparatus in accordance with claim 6, wherein said mandrel is provided with an expandable collar in the vicinity of said free end for contacting the interior of the tube, said collar being rotated when said tube is brought into position to be cut by said means for cutting.

* * * * *

UNITED STATES PATENT AND TRADEMARK OFFICE
CERTIFICATE OF CORRECTION

PATENT NO. : 4,713,992

DATED : December 22, 1987

INVENTOR(S) : Jean-Paul LANGUILLAT

It is certified that error appears in the above-identified patent and that said Letters Patent is hereby corrected as shown below:

On the cover page, Attorney, Agent or Firm, change "& Greenblum Sandler" to ---Sandler & Greenblum---.

At column 7, line 22 change "desired" to ---desires---.

At column 7, line 53 change "usage" to ---usages---.

At column 7, line 57 change "travelling" to ---trailing---.

At column 8, line 13 change "an" to ---a---.

Signed and Sealed this

Twenty-seventh Day of September, 1988

Attest:

DONALD J. QUIGG

Attesting Officer

Commissioner of Patents and Trademarks